No. 775,884. PATENTED NOV. 22, 1904.
C. A. BACKSTROM.
SHAFT COUPLING.
APPLICATION FILED MAR. 28, 1904.
NO MODEL.
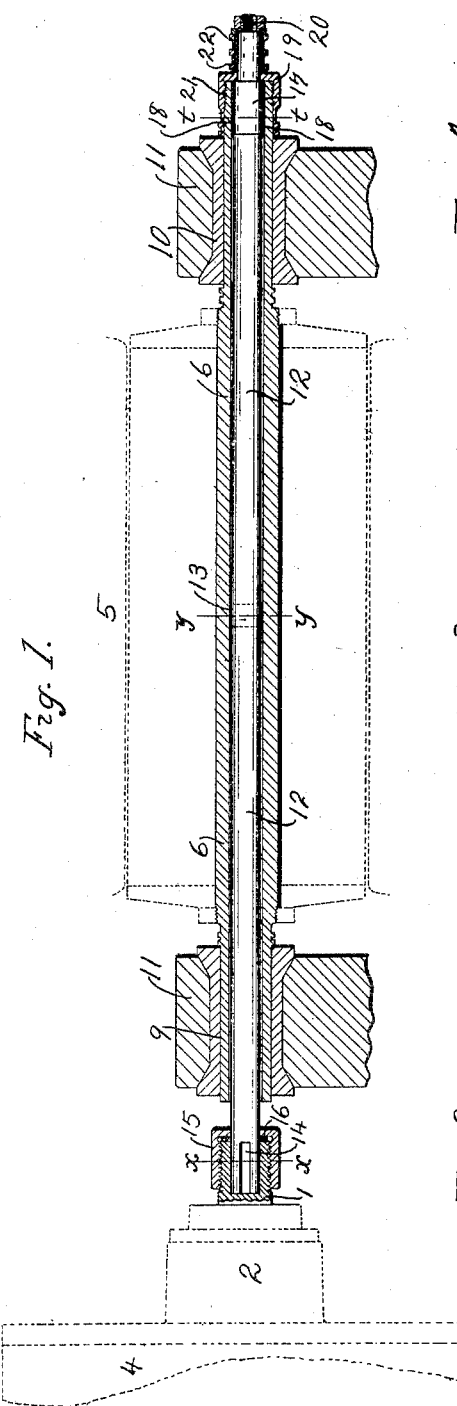
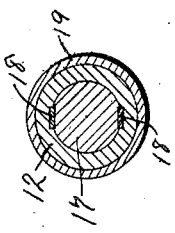
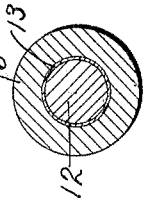
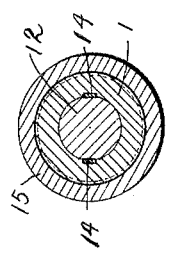
WITNESSES:
INVENTOR
Charles A. Backstrom
BY Edwin E. Wheeler
ATTORNEYS No. 775,884. Patented November 22, 1904.

UNITED STATES PATENT OFFICE.

CHARLES A. BACKSTROM, OF MILWAUKEE, WISCONSIN.

SHAFT-COUPLING.

SPECIFICATION forming part of Letters Patent No. 775,884, dated November 22, 1904.

Application filed March 28, 1904. Serial No. 200,357. (No model.)

*To all whom it may concern:*

Be it known that I, CHARLES A. BACKSTROM, a citizen of the United States, residing at Milwaukee, county of Milwaukee, and State of Wisconsin, have invented new and useful Improvements in Shaft-Couplings, of which the following is a specification.

My invention relates to improvements in shaft-couplings, and relates especially to the provision of means for connecting a turbine-shaft with that of a dynamo or other machine having its shaft in axial alinement with that of the turbine.

The object of my invention is to provide means whereby rotary elements of two machines in approximate axial alinement, each having a plurality of bearings, may be axially coupled together without producing unequal pressure in any of the bearings notwithstanding slight inequalities in their relative positions with reference to the common axial line.

In the following description reference is had to the accompanying drawings, in which—

Figure 1 is a longitudinal sectional view of a shaft-coupling embodying my invention in which a dynamo and one end of a turbine, together with their bearings, are indicated. Figs. 2, 3, and 4 are transverse sectional views drawn on lines $x\,x$, $y\,y$, and $t\,t$, respectively, of Fig. 1.

Like parts are identified by the same reference characters throughout the several views.

1 is the shaft of a turbine or driving machine having ordinary bearings in a hub 2 of the stationary member, one end of which is indicated at 4.

5 represents a dynamo or driven machine provided with a tubular shaft 6, mounted in bearings 9 and 10, carried by pillow-blocks 11. A flexible coupling-shaft 12 is connected at one end with the turbine-shaft 1 and extends through the dynamo-shaft 6 with its other end attached to said dynamo-shaft. Intermediate of its ends the coupling-shaft is of less diameter than the opening in the shaft 6, whereby it is permitted to yield in case the bearings of the turbine are not strictly in line with those of the dynamo. An annular cushion-ring 13, of rubber or other compressible material, is preferably located at an intermediate point between the coupling-shaft 12 and dynamo-shaft 6 in order to check vibration.

In the drawings the turbine-shaft 1 is shown with an end socket in which the end of the coupling-shaft 6 is entered, the latter having key-ribs 14, which fit corresponding channels in the turbine-shaft. A thimble-nut 15 on the coupling-shaft is screwed upon the end of the turbine-shaft, with an interposed washer 16, which bears against the end of the shaft and the key-ribs 14. The turbine-shaft and coupling-shaft may, however, be formed integrally, if desired.

The outer end of the coupling-shaft is provided with an enlargement 17, fitting the dynamo-shaft opening, and provided with key-ribs 18, engaged in channels in said shaft 6. A sleeve-nut 19 is screwed to the reduced end of the coupling-shaft 12 at 20 and to the end of the dynamo-shaft 6 at 21. The commutator-rings 22 are preferably located on this sleeve-nut 19.

While the coupling-shaft 12 is described as "flexible," this term is not intended to imply that material having pronounced flexibility is to be used, for the ordinary materials used for shafting will usually be found sufficiently flexible in the described relation, in view of the distance between the points of connection with the other shafts. In well-constructed machines only a slight flexion of the shaft 12 will be required in any case, for the bearings will be brought as nearly as possible into alinement.

Having thus described my invention, what I claim as new, and desire to secure by Letters Patent, is—

1. The combination of a driven machine having a tubular shaft; a driving-machine having a shaft in axial alinement with that of the driven machine; and a coupling-shaft within said tubular shaft connected with the latter near one end, and having its other end connected with the shaft of the driving-machine.

2. The combination of a driving-machine; a driven machine having a tubular shaft; a shaft connected with the tubular shaft near one end of the latter and extending loosely through said tubular shaft and connected with the movable member of the driving-machine.

3. The combination of two machines having rotary elements axially alined; a tubular shaft for the rotary element of one machine; another shaft located in the tubular shaft and connected therewith near the end farthest from the other machine; said inner shaft being connected with the rotary element of said other machine, and having an intermediate portion of less diameter than the tubular shaft adapted to yield laterally within that portion of said tubular shaft nearest to said other machine.

4. The combination of two machines having rotary elements in axial alinement; a tubular shaft for one of said rotary elements; a flexible coupling-shaft in the tubular shaft of less diameter than the opening in the tubular shaft, but connected to such shaft near one end; said coupling-shaft being extended from the point of connection through the other end of the tubular shaft and connected with the rotary element of the other machine.

In testimony whereof I affix my signature in the presence of two witnesses.

CHARLES A. BACKSTROM.

Witnesses:
LEVERETT C. WHEELER,
JAS. B. ERWIN.